Jan. 27, 1970   W. W. RIGROD   3,492,599
MODE-LOCKED LASER PULSE GENERATOR
Filed Sept. 17, 1965   2 Sheets-Sheet 1

INVENTOR
W. W. RIGROD
BY
ATTORNEY

3,492,599
MODE-LOCKED LASER PULSE GENERATOR
William W. Rigrod, Millington, N.J., assignor to Bell
 Telephone Laboratories, Incorporated, New York, N.Y.,
 a corporation of New York
Filed Sept. 17, 1965, Ser. No. 487,974
Int. Cl. H01s 3/10
U.S. Cl. 331—94.5                11 Claims

ABSTRACT OF THE DISCLOSURE

Phase locking of a laser is realized by locating, in the laser cavity, a passive saturable attenuating element whose initial attenuation is sufficiently low to permit a plurality of laser modes to commence to oscillate, and whose attenuation decreases as the radiation intensity increases.

---

This invention relates to lasers.

While heretofore high-power laser pulses having dependable characteristics have been obtained by a process known as Q-switching, it is also desirable spontaneously to generate high-power pulses having equally dependable characteristics at much higher rates than can be obtained with Q-switching. Moreover, continuous-wave pumping is desirable, instead of the pulsed pumping employed with Q-switched lasers.

Spontaneous pulse generation has heretofore been observed in lasers under specialized conditions. Thus, it has been observed in gas lasers capable of supporting a plurality of modes and apparently arises from a pulling effect on the modes due to the dispersive nature of the gain characteristics when the optical resonator Q is sufficiently low. Low Q implies that the cavity is internally lossy or permits excessive coupling from the cavity. These conditions are not favorable to the production of high power output pulses or of successive pulses that are dependably alike.

An object of my invention is the spontaneous generation of righ power laser pulses having dependable characteristics and high repetition rates.

Accordingly, my invention resides in my recognition that the pulling effect among modes in an inhomogeneously saturating laser can be provided compatibly with high-power output pulses by including a passive radiation-attenuating element therein that has a sufficiently low attenuation to permit a plurality of modes to start to oscillate spontaneously and provides a decreasing attenuation as the radiation intensity increases. Such an element is illustratively a bleachable radiation absorber of appropriate strength or a semiconducting mirror having a reflectivity that increases with radiation intensity. As used herein, attenuation includes the coupling of radiation out of the resonator, as well as the absorbing of radiation. A passive radiation attenuator providing the attenuation characteristic employed in the present invention will hereinafter be called a saturable attenuating element.

"Inhomogeneously saturating," as used herein in reference to the laser, means that saturating the gain at one axial mode frequency does not saturate the gain at another axial mode frequency differing from the first frequency by more than a "hole width." A "hole width" is a frequency range corresponding to a velocity class of excited atoms from which a given axial mode can draw energy. Most gas lasers, for example, are "inhomogeneously saturating," whereas most solid state lasers are "homogeneously saturating."

"Homogeneously saturating," as used herein, means that the gains at all frequencies of interest vary and saturate together. Ruby lasers, for example, are homogeneously saturating in the sense that saturating the gain for any one axial mode frequency saturates to the same degree the gain for all other axial mode frequencies within the line width. Moreover, the term "homogeneously saturating" will be used hereinafter to describe the absorption cell, which tends to saturate simultaneously for all the axial mode frequencies that spontaneously start to oscillate in the laser.

A more complete understanding of my invention may be obtained from the following detailed description together with the drawing, in which.

Figure 1:
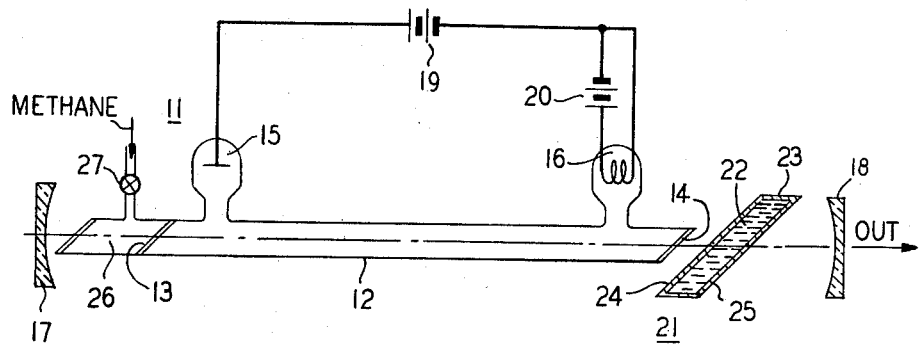
FIG. 1 is a partially schematic and partially pictorial showing of one embodiment of the invention employing a bleachable optical absorber.

The object and operation of my invention may be better understood in view of the following background information. Saturable attenuating elements of the same general type as used in my invention have heretofore been used for Q-switching of homogeneously-saturating lasers such as the ruby laser. In Q-switching, the interaction of the homogeneously saturating laser and the saturable attenuating element is such that no particular frequency spacing of modes occurs; and the pulse repetition rate depends only upon the amount by which the peak gain exceeds threshold and the response and relaxation time constants of the saturable attenuating device.

I have recognized that in certain types of gas lasers, such as the helium-neon laser or the argon-ion gas laser, it is possible to adapt the laser and the saturable attenuating device to provide a new and useful type of cooperation, namely, the phase locking of a multiplicity of modes that oscillate spontaneously under conditions of continuous-wave pumping. In this case, pulse repetition does not require the saturable attenuating device to return to a maximum attenuation condition, but merely needs a sufficient incremental variation in its characteristics to provide coupling between the modes. As a result, the pulse repetition rate can be much higher than that obtained from a Q-switched ruby laser; and the high degree of ordering of the modes, specifically, equal spacing thereof, provides more efficient utilization of the laser active material. Moreover, very little power need be consumed in the saturable attenuating device.

A gas laser suitable for obtaining this interaction includes an inhomogeneously saturating gaseous active medium and a resonator that are mutually adapted to provide a mode spacing marginally greater than the hole width but sufficiently small that the gain of each mode is only slightly decreased by the presence of its neighbors.

A distinctive characteristic of the saturable attenuating device in this invention is that its initial attenuation be sufficiently weak (much weaker than that found useful for effective Q-switching) to permit a plurality of modes, preferably three or more, to start to oscillate spontaneously even in the presence of the saturable attenuating device. This principle includes the special case in which one mode starts to oscillate initially, causing the attenuating device to saturate enough to let one or more other modes start to oscillate.

With the foregoing relationship of the laser and the saturable attenuating device, phase locking of the various modes will occur and will force all of the modes to assume equal frequency spacings, apparently the most efficient configuration for deriving energy from the laser medium. When the modes are so phase-locked, their combined intensity produces a pulse-modulated output wave, the interval between pulses corresponding to a round-trip transit time for light in the resonator.

We may also consider the interaction to be a mixing of the plurality of modes supplied by the laser within the nonlinear attenuating device. That is, the transmission of the device is caused to vary incrementally at the mode spacing frequency, due to its mixing action; and a transmission peak occurs when all the modes are in phase within the device. Such an in-phase condition tends to reinforce itself. In connection with this view of the invention it should be particularly noted that the mixing action is achieved without supplying a signal at the mode spacing frequency.

A specific embodiment of the invention employing a bleachable optical absorption cell as the saturable attenuating element is shown in FIG. 1. The inhomogeneously saturating laser employed in the embodiment is a helium-neon laser 11 including the container 12 containing a helium and neon gas mixture and having Brewster angle end windows 13 and 14, and the anode 15, cathode 16 and its heater source 20, the direct-current pumping power source 19 connected in conventional polarity between anode 15 and cathode 16, an optical resonator comprising the near-confocal reflectors 17 and 18 disposed beyond the Brewster angle end windows 13 and 14, respectively, and frequency-selecting gas cell 26, also with Brewster angle windows, near reflector 17. It will be noted that the pumping supplied by source 19 is a form of continuous-wave pumping, as opposed to pulsed pumping.

With the resonator near the reflector 18 is disposed the bleachable optical absorption cell 21, which includes a kryptocyanine solution 22 contained within a container 23, which has Brewster angle end windows 24 and 25. The attenuation of cell 21 varies inversely with radiation intensity until saturation occurs.

Helium-neon laser 11 is of the general type disclosed in the copending patent application of J. D. Rigden and A. D. White Ser. No. 204,150 filed June 21, 1962. The ratio of helium pressure to neon pressure is about seven to one. The total gas pressure is about 1.1 torr.

The gas cell 26 contains an organic vapor such as methane at a pressure of several hundred torr in order to emphasize the 6328 angstrom line or transition and to tend to suppress competing infra-red oscillations. The valve 27 permits adjustment of pressure. However, it readily permits the coexistence of three or more modes within the 6328 angstrom line width. Tube 12 has an inside diameter of 4 millimeters and an effective discharge length between electrodes 15 and 16 of 120 millimeters.

Reflector 17 is coated to be opaque with vaccum-deposited gold, and the reflector 18 is coated with vacuum-deposited gold to be partially transmissive to permit the abstraction of the generated pulses for utilization. It is understood, of course, that reflectors 17 and 18 could be any of a great variety of other types. In the absence of cell 21, laser 11 provides an effective gain of about 9.2 percent per pass.

Figure 4:
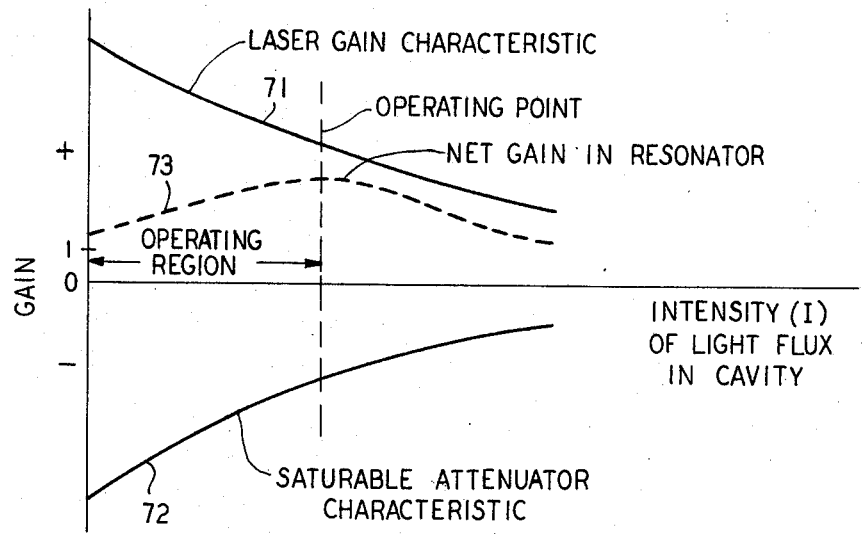
FIG. 4 shows curves that are useful in understanding the theory and operation of the invention.

The bleachable optical absorption cell 21 contains typically a solution of $1 \times 10^{-7}$ mole to $10 \times 10^{-7}$ mole of kryptocyanine in methanol. The kryptocyanine comprises 1,1'-diethyl-4,4'-carbocyanine iodide. The preparation of such solutions to desired concentrations is described by W. H. Mills and W. T. K. Braunholtz in the Journal of the Chemical Society, volume 123, page 2804, at pages 2806–2808 and page 2811 (1923) (lepidine ethonitrate heated with disulfide and pyridine, then the blue kryptocyanine dye extracted). Within the above range of concentrations which correspond to a range of attenuations from approximately two percent per centimeter to approximately twenty percent per centimeter at 6328 A., the particular concentration used depends on the laser gain and is chosen to provide the desired starting conditions, as illustrated in FIG. 4 by the intersections of curves 71 and 72 with the zero-intensity axis. In other words, the difference between the curves, or the net gain in the resonator, is sufficiently greater than unity at zero radiation intensity to permit a plurality of axial modes, preferably three or more, to start to oscillate spontaneously in the resonator.

For a thickness of one centimeter of the solution in cell 21 along the laser axis, and for a gain of laser 11 at 6328 A. of 7–10 percent per pass at zero radiation intensity (9.2 percent specified above), the concentration of the particles in the methanol solution advantageously is about $2 \times 10^{-7}$ mole ($2 \times 10^{-5}$ mole percent), which yields 2 percent to 3 percent attenuation per pass.

In operation, once the plurality of axial modes have started to oscillate, the system characteristics vary as the radiation intensity increases in the general way illustrated by curves 71, 72 and 73 of FIG. 4. It should be noted that the curves of FIG. 4 are not to scale and indicate qualitative relationships only. Moreover, they represent steady state conditions and cannot completely represent the transients involved. The laser gain decreases monotonically, the attenuation (negative gain) provided by cell 21 also decreases, and the net gain in the cavity increases up to the value permitted by the operating current, providing a rapid build up of the light flux in the resonator until a momentary equilibrium is established when the net power gain per pass equals the remaining losses in the cavity, including that due to the output power. This condition provides the top or maximum amplitude of the pulse. The pulse width equals the pulse transit time $2L/C$, where C is the velocity of light and L is the spacing of reflectors 17 and 18 in compatible units, divided by $n$, the number of axial modes that were permitted to start to oscillate simultaneously.

It will be noted that at the peak of the laser pulse, the solution in the cell 21 has not been completely bleached; moreover, cell 21 is operating in a portion of its characteristic that permits it to recover sufficiently for the start of the next pulse in less than the pulse transit time $2L/C$, which for a 1.5 meter-long laser cavity is ten (10) nanoseconds. The recovery does not necessarily return cell 21 to the initial condition indicated by curve 72, even though the radiation intensity has fallen to zero. This aspect can not be easily demonstrated by curves of the type shown in FIG. 4.

Nevertheless, the next succeeding pulse is still a sharp pulse having the same maximum amplitude as the first pulse, provided the incremental variation of attenuation provided by cell 21 is sufficient to provide phase-locking of the plurality of modes. The required incremental variation is not great and can be as low as one percent or less attenuation of the radiation per pass.

Several modifications of the embodiment of FIG. 1 can be made. The particular constituents and concentrations thereof in the bleachable absorption cell 21 depend upon the gain and wavelength provided by the gas laser being employed. For example, when cell 21 contains phthalocyanine solution in 1-chloronaphthalene, the metal ion may be changed so that its attenuation variation with respect to wavelength is peaked near the laser wavelength. For example, a phthalocyanine solution including copper ions may be employed in cell 21 when laser 11 is a helium-neon laser operating of 6328 A. Phthalocyanine can be made by methods similar to those for making kryptocyanine, as specified above, and is commercially available. For a helium-neon laser operating at $3.39\mu$, cell 21 may contain methane at very low pressure, which acts as a bleachable absorber at that wavelength. The frequency-selecting gas cell 26 is, of course, eliminated inasmuch as its range of methane pressures is too high. Thus, cell 21 can be a gas absorption cell instead of a cell containing a solution. Alternative gas absorption cells for employment according to the invention include gas-discharge absorption cell at sufficiently high pressure that the collision rate exceeds the spontaneous decay rates of the excited states, causing the cell to saturate homogeneously.

As a further example, when laser 11 is an argon-ion laser of the general type disclosed in the copending patent application of E. I. Gordon et al., Ser. No. 385,159 filed July 27, 1964, cell 21 may contain a metal-free solution of phthalocyanine in 1-chloronaphthalene. The concentration of the phthalocyanine is about $7 \times 10^{-5}$ mole (about 5 percent attenuation per pass initially for a one-centimeter thick cell 21); and the gain per pass of the argon-ion laser at 4990 angstroms is adjusted to be about 15 percent per pass in the absence of cell 21. A plurality of axial modes will start to oscillate simultaneously in the presence of the cell 21.

In all such cases, the saturable attenuating cell is adapted to provide an initial attenuation that is less than the laser gain minus any fixed attenuation in the system. Of course, the attenuation of the cell must decrease as the radiation intensity increases.

Figure 2:
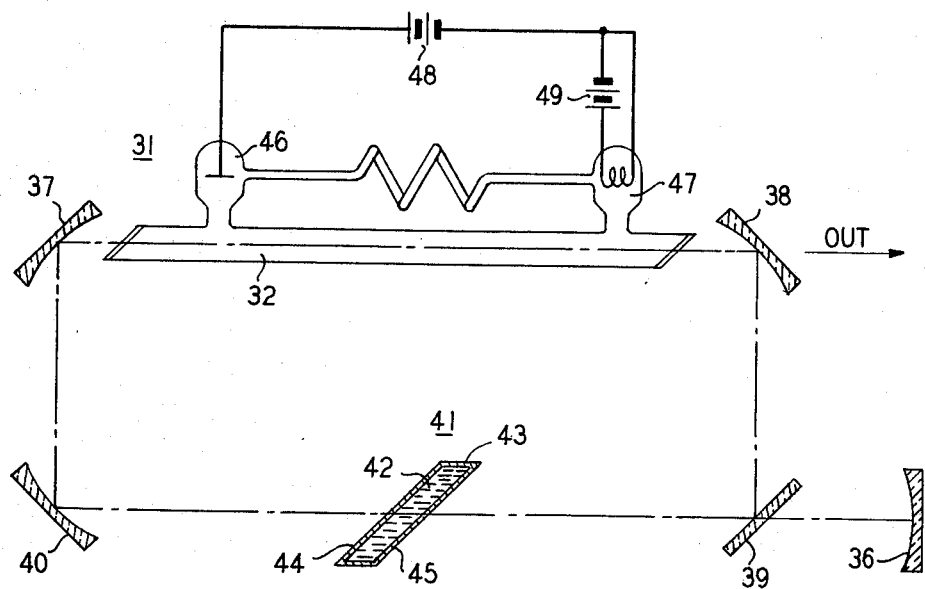
FIG. 2 is a partially schematic and partially pictorial modification of the embodiment of FIG. 1 to provide a ring laser employing the principles of the invention.

The invention is also applicable to ring lasers as shown in FIG. 2. Laser 31 includes a tube 32 and excitation means like those employed in FIG. 1 and an argon active gas ionized by sufficient excitation. The reflecting and focusing elements 37–40 of laser 31 are disposed to reflect the beam at oblique incidence and to direct it around a closed path, the laser tube and active material being in one leg of the path. They are coated with vacuum-deposited gold and are advantageously astigmatic in order to maintain a circular cross-section of the beam, as disclosed in my copending application, Ser. No. 465,135 filed June 18, 1965, and assigned to the assignee hereof. Further, an external reflector 36 reflects the counter-clockwise traveling-wave radiation back upon itself, matching the waist of the retro-reflected beam to the waist of the clockwise beam between reflectors 39 and 40. This arrangement produces a unidirectional traveling wave, as disclosed in my above-cited copending patent application and is advantageous because, first, it makes the location of bleachable absorption cell noncritical; second, it permits more efficient utilization of the laser active medium for production of the pulses; and, third, it concentrates a large portion of the available energy in each generated pulse. The external disposed reflector does not attenuate the desired unidirectional wave. The first advantage is to be particularly emphasized; whereas in the embodiment of FIG. 1 cell 21 was located near the reflector 18, in the embodiment of FIG. 2 the cell 41, containing a metal-free $7 \times 10^{-5}$ mole solution of phthalocyanine in 1-chloronaphthalene, is midway between reflectors 39 and 40 and could be located anywhere around the closed path while still having substantially the same effect. In all other respects, the embodiment of FIG. 2 is substantially like that of FIG. 1, the pulse transit time now being $L/C$ where L is the length of the path and C is the velocity of light, in compatible units.

Figure 3:
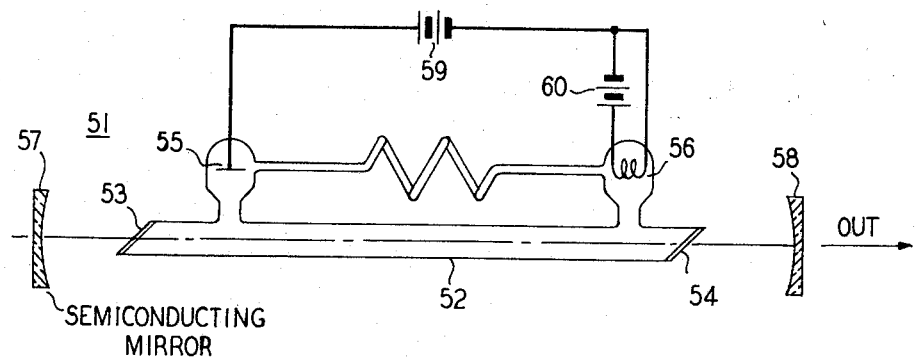
FIG. 3 is a partially schematic and partially pictorial showing of another embodiment of the invention employing semiconducting mirrors.

Another embodiment of my invention is shown in FIG. 3 and employs a semiconducting mirror whose reflectivity increases with light intensity as the saturable attenuating device.

Specifically, laser 51 includes a tube 52 containing argon gas and having direct-current excitation means 55, 56, 59 and 60, battery 60 being the heater source for cathode 56. The excitation maintains the gas ionized and maintains the population inversion. It also includes an optical resonator formed by the focusing reflectors 57 and 58, the reflector 58 being coated with vacuum-deposited gold and being partially transmissive (reflectivity 95 percent) to permit the abstraction of an output.

While it forms part of the resonator, reflector 57 is simultaneously a saturable attenuating element adapted according to the present invention. Reflector 57 comprises indium antimonide having a polished reflecting surface that provides a minimum reflectivity of about 40 percent for low radiation intensities and a maximum reflectivity of about 90 percent at the peak of each generated pulse. For details of such reflectors, see the article by Sooy et al., Applied Physics Letters, 5 (3), 54, (1964). In view of the relatively low initial reflectivities reported for semiconductors in the visible wavelength range, such mirrors are best suited to high-gain gas lasers, such as the rare-gas ion lasers. The radius of curvature of reflector 57 is chosen to minimize diffraction losses in the resonator; and reflection occurs at normal incidence.

It should be noted that the initial 40 percent reflectivity is sufficient to permit a plurality of modes to start to oscillate in laser 51 if the gain per pass of the radiation through tube 52 is about 45 percent. This gain is feasible in an ion laser, particularly one made according to the above-cited copending patent application of E. I. Gordon et al., or in their subsequent applications Ser. No. 439,657, filed Mar. 15, 1965, Ser. No. 466,014 filed June 22, 1965, and all assigned to the assignee hereof.

The principles of operation of the embodiment of FIG. 3 are substantially the same as those of the embodiment of FIG. 1, as described above.

The embodiment of FIG. 3 can be modified to provide similar operation in a ring laser. Reflection from the semiconducting mirror is facilitated by adapting the laser to polarize the radiation perpendicular to the plane of the ring. Although both the minimum and maximum reflectivities will still be somewhat less than in the linear arrangement of FIG. 3, this effect is easily compensated by increasing the length of the active medium and the applied excitation power to provide a gain per pass of about 45–50 percent. Such a gain per pass is easily obtained if the rare gas ion ring laser is provided with unidirectional traveling wave operation, as disclosed in my above-cited copending patent application.

In all cases, it is understood that the above-described arrangements are merely illustrative of a small number of the many possible embodiments and applications of the principles of the invention. Numerous and varied other arrangements in accordance with these principles may readily be devised by those skilled in the art without departing from the spirit and scope of the invention.

What is claimed is:

1. A mode locked laser comprising an inhomogeneously saturating laser medium suitable for the stimulated emission of radiation, means for continuously pumping said medium, and an optical resonator disposed about said medium and adapted to permit the abstraction of said radiation, characterized in that said optical resonator includes means for providing attenuation in inverse relation to the intensity of radiation therein and whose maximum attenuation permits a plurality of axial modes of said radiation to start to oscillate spontaneously, and in that the output from said laser comprises a train of pulses equally spaced at intervals corresponding to the round-trip transit time for said radiation in said laser.

2. A mode locked laser according to claim 1 in which the means for providing attenuation is a saturable attenuating device.

3. A mode locked laser according to claim 2 in which the saturable attenuating device is a cell containing a bleachable absorbing medium providing an initial attenuation of incident radiation between two and twenty percent.

4. A mode locked laser according to claim 2 in which the saturable attenuating device is a reflector of semiconductor material adapted to have a reflectivity directed related to incident radiation intensity, the initial reflectivity of said reflector being at least 40 percent.

5. A mode locked laser according to claim 1 in which the laser medium is a gas.

6. A mode locked laser according to claim 5 in which the optical resonator comprises a plurality of reflectors adapted to reflect at oblique incidence and to direct the radiation around a closed path including the gaseous medium, said resonator including means for providing unidirectional traveling-wave oscillation.

7. A mode locked laser according to claim 6 in which the means for providing unidirectional traveling-wave oscillation comprises a reflector disposed external to the resonator in order not to attenuate said oscillation and adapted to reflect radiation propagating opposite the desired direction back into said resonator for propagation therearound in the desired direction.

8. A mode locked laser according to claim 1 in which the means for providing attenuation is a bleachable absorbing medium.

9. A mode locked laser according to claim 8 in which the bleachable absorbing medium is a gas.

10. A mode locked laser according to claim 8 in which the bleachable absorbing medium is a liquid.

11. A mode locked laser according to claim 8 in which the bleachable absorbing medium is a gas-discharge cell.

References Cited

Siegman, Nonlinear Optical Effects: An Optical Power Limiter, Applied Optics, vol. 1, No. 6 (November 1962) pp. 739–744 particularly Fig. 6.

Carmichael et al. Generation of Giant Optical Maser Pulses Using a Semiconductor Mirror, Nature (May 23, 1964) pp. 787–788.

Kafalas et al., Photosensitive Liquid Used as a Nondestructive Passive Q-Switch in a Ruby Laser, J. Appl. Phys. vol. 35, No. 8 (August 1964) pp. 2349–2350.

Sorokin, Amplifier Chain Using Phthalocyanine Dye. IBM Tech. Discl. Bull., vol. 7, No. 3 (August 1964) p. 230.

JEWELL H. PEDERSEN, Primary Examiner

W. L. SIKES, Assistant Examiner

U.S. Cl. X.R.

350—160